United States Patent
Lamp

(10) Patent No.: US 11,747,210 B2
(45) Date of Patent: Sep. 5, 2023

(54) USE OF AN OPTICAL WAVEGUIDE FOR THE OPTICAL MEASUREMENT OF THE TEMPERATURE OF A HIGH-TEMPERATURE MELT, AND DEVICE FOR THIS PURPOSE

(71) Applicant: MINKON GmbH, Erkrath (DE)

(72) Inventor: Torsten Lamp, Dusseldorf (DE)

(73) Assignee: MINKON GmbH, Erkrath (DE)

(*) Notice: Subject to any disclaimer, the term of this patent is extended or adjusted under 35 U.S.C. 154(b) by 448 days.

(21) Appl. No.: 16/964,480

(22) PCT Filed: Jan. 25, 2019

(86) PCT No.: PCT/EP2019/051892
§ 371 (c)(1),
(2) Date: Jul. 23, 2020

(87) PCT Pub. No.: WO2019/145499
PCT Pub. Date: Aug. 1, 2019

(65) Prior Publication Data
US 2021/0025759 A1   Jan. 28, 2021

(30) Foreign Application Priority Data
Jan. 26, 2018   (DE) ...................... 10 2018 000 615.9

(51) Int. Cl.
*G01J 5/04* (2006.01)
*G01J 5/0821* (2022.01)
*G01J 5/00* (2022.01)

(52) U.S. Cl.
CPC .............. *G01J 5/004* (2013.01); *G01J 5/042* (2013.01); *G01J 5/046* (2013.01); *G01J 5/0821* (2013.01)

(58) Field of Classification Search
CPC .. G01J 5/004; G01J 5/042; G01J 5/046; G01J 5/0821
See application file for complete search history.

(56) References Cited

U.S. PATENT DOCUMENTS 4,407,561 A * 10/1983 Wysocki .............. G02B 6/4402
 385/128
4,893,895 A *  1/1990 Berthold ................... F27B 3/28
 385/13

(Continued)

FOREIGN PATENT DOCUMENTS

DE   102005061675 B3   7/2007
DE   102014012697 A1   3/2016

(Continued)

OTHER PUBLICATIONS

CLARIANT—HOSTASTAT data sheet-obtained from https://www.clariant.com/en/Solutions/Products/2017/07/04/08/40/Hostastat-FA-68-V on Oct. 23, 2022 (Year: 2022).*

(Continued)

*Primary Examiner* — David P Porta
*Assistant Examiner* — Jeremy S Valentiner
(74) *Attorney, Agent, or Firm* — Howard IP Law Group, PC

(57) ABSTRACT

The invention relates to the use of an optical waveguide for optically measuring the temperature of a high-temperature melt, the optical waveguide directing electromagnetic waves from the measuring point to an optical detector and being moved to the measuring point with the aid of a fluid through a line through which the fluid flows. The optical waveguide has a core, cladding and a coating, with the coating consisting of a protective layer and an outer protective sheath. The outer protective sheath is firmly connected to the protective layer.

12 Claims, 2 Drawing Sheets

(56) References Cited

U.S. PATENT DOCUMENTS

| | | | |
|---|---|---|---|
| 5,733,043 A | 3/1998 | Yamada et al. | |
| 6,964,516 B2 | 11/2005 | Coleman, Jr. | |
| 7,282,551 B2 * | 10/2007 | Hoff | B32B 27/08 |
| | | | 526/317.1 |
| 7,891,867 B2 | 2/2011 | Dams et al. | |
| 3,038,344 A1 | 10/2011 | Lamp et al. | |
| 9,726,545 B2 | 8/2017 | Neyens et al. | |
| 10,514,302 B2 * | 12/2019 | Kendall | G01K 1/026 |
| 2008/0273852 A1 * | 11/2008 | Parker | G01J 5/0821 |
| | | | 385/128 |
| 2017/0108657 A1 * | 4/2017 | Kendall | G01N 33/205 |
| 2017/0307444 A1 * | 10/2017 | Fischer | G01J 5/051 |

FOREIGN PATENT DOCUMENTS

| | | |
|---|---|---|
| EP | 0655613 B1 | 3/1999 |
| EP | 1857792 A1 | 11/2007 |
| EP | 2799824 A1 | 11/2014 |
| EP | 3051262 A1 | 8/2016 |
| JP | H07151918 A | 6/1995 |
| JP | 2011022165 A | 2/2011 |
| JP | 2014219395 A | 11/2014 |
| WO | 2007079894 A1 | 7/2007 |
| WO | WO-2016034272 A2 * 3/2016 ............. G01J 5/004 |

OTHER PUBLICATIONS

DOW—ENTIRA data sheet-obtained from https://www.dow.com/en-us/pdp.entira-as-sd100-polymer-modifier.1891632z.html# overview on Oct. 23, 2022 (Year: 2022).*

BASF—IRGASTAT data sheet-obtained from https://blogs.edf.org/health/files/2018/12/Perchlorate-Irgastat-P18-irgastat_p_range.pdf on Oct. 23, 2022 (Year: 2022).*

International Search Report under International Patent Application No. PCT/EP/2019/051892 dated May 17, 2019.

* cited by examiner

USE OF AN OPTICAL WAVEGUIDE FOR THE OPTICAL MEASUREMENT OF THE TEMPERATURE OF A HIGH-TEMPERATURE MELT, AND DEVICE FOR THIS PURPOSE

CROSS-REFERENCE TO RELATED APPLICATIONS

This application is the national stage application under 35 U.S.C. § 371 of International Application No. PCT/EP2019/051892 filed on 25 Jan. 2019, which claims priority to patent application DE 10 2018 000 615.9 filed 26 Jan. 2018, the entire disclosures of which are incorporated herein by reference in their entireties.

FIELD OF INVENTION

The invention relates to the use of an optical waveguide in a method for optically measuring the temperature of a high-temperature melt and to a method for optically measuring the temperature of a high-temperature melt, as well as a converter.

SUMMARY

The optical waveguide guides electromagnetic waves from the measuring point to an optical detector. The optical detector is used to determine the temperature of the high-temperature melt by analyzing the electromagnetic radiation directed from the optical waveguide to the optical detector. The optical waveguide is transported to the measuring point via a cable. It is driven by a fluid that flows through the line. The optical waveguide has a core, cladding and a coating, with the coating consisting of a protective layer and an outer protective sheath.

The use of such optical waveguides for the optical measurement of the temperature of a high-temperature melt is already known. International patent application WO 2007/079894 A1 discloses a converter with a container for holding molten metal. The converter also has a measuring device for optically measuring the temperature of the molten metal. The measuring device consists of an optical waveguide in order to guide electromagnetic radiation emitted by the molten metal to an optical detector. The measuring device further comprises an optical detector for determining the temperature of the molten metal from an analysis of the electromagnetic radiation. A line through which fluid flows is arranged between the optical detector and the container. The optical waveguide is moved in the direction of the measuring point, where it is moved with the aid of the flowing fluid.

In order to be able to continuously measure the temperature of the molten metal in the converter, the procedure used in international patent application WO 2007/079894 A1 is to continuously feed the optical waveguide to the measuring point, that is to say the molten metal. This is necessary because the high temperatures of the molten metal cause the optical waveguide to gradually melt at its end that is immersed in the molten metal or in the immediate vicinity of the end placed into the molten metal.

International patent application WO 2007/079894 A1 discloses types G62.5/125 as an optical waveguide that can be used in the converter. This consists of a core, cladding and a coating. The coating consists of a protective layer called the primary coating. However, the primary coating is insufficient to adequately protect the optical waveguide from mechanical and thermal loads.

In prior art, therefore, an optical waveguide, which is used for optically measuring the temperature of a high-temperature melt, has a coating which has an outer protective sheath in addition to the protective layer. The outer protective sheath is usually also referred to as a secondary coating. In the case of an optical waveguide used for the purpose described above, the protective layer is loosely connected to the protective sheath, i.e. the protective layer is surrounded by the outer protective sheath, but the outer diameter of the protective layer is smaller than the inner diameter of the outer protective sheath. In particular, this is to avoid mechanical and thermal loads being transferred directly from the outer protective sheath to the protective layer and thereby to the cladding and core. It is feared that the signal transmission will deteriorate. Instead, the loose connection means that mechanical loads should be absorbed almost exclusively by the outer protective sheath.

It was recognized that this type of coating of an optical waveguide has an adverse effect on its flow properties. The optical waveguide twists in the line if it has to be moved to the measuring point with the aid of the fluid in the line. As a result, the optical waveguide cannot be moved to the measuring point in a controlled manner and the optical waveguide can even get stuck in the line. This in turn means that, in particular, continuous temperature measurement, which is important for temperature control, for example, cannot be guaranteed.

The object of this invention is therefore to propose the use of an optical waveguide in a method for optically measuring the temperature of a high-temperature melt, as well as such a method and a converter in which the optical waveguide is moved to the measuring point with the aid of a fluid through a line through which the fluid flows, in which the controlled feed of the optical waveguide to the measuring point is improved.

The main idea of the invention is to use an optical waveguide which has a coating consisting of a protective layer and an outer protective sheath, the outer protective sheath being firmly connected to the protective layer. It has been shown that such an optical waveguide has significantly better flow properties than an optical waveguide with a loose connection between the protective layer and the outer protective sheath. The optical waveguide can thus be moved to the measuring point in a more controlled manner through the line where the fluid flows, without twisting or getting stuck in the line. In particular, this can ensure a continuous measurement of the high-temperature melt, which is particularly important for the control of the melt bath temperature. If this is missing, the high-temperature melt can become unusable for further processing. This results in high losses, especially with molten metals. In particular, an extreme amount of energy is required to melt a large amount of metal. In addition, there can be long downtimes until the unusable molten metal is disposed of.

In the context of the invention, the term "optical waveguide" consists of a core, cladding and a coating (elements of the optical waveguide). The elements of the optical waveguide are usually cylindrical and arranged coaxially with one another. The cladding surrounds the core and the coating surrounds the cladding. The length of the optical waveguide is usually much larger than its diameter.

The core and the cladding (fiber) serve to conduct electromagnetic waves. The material of the core has a higher refractive index than the material of the cladding. This results in total reflection of the electromagnetic waves at the interface between the core and the cladding. Electromagnetic waves that penetrate into the optical waveguide from one end of the optical waveguide are reflected at said interface until they emerge at the other end of the optical waveguide. The electromagnetic waves are transmitted with almost no loss.

The core and cladding usually consist of quartz glass, the core usually being coated with foreign atoms in order to give it a higher refractive index. Other materials for the core and the cladding, which are known from prior art, are in principle also suitable for the invention.

According to the invention, the coating has a protective layer and an outer protective sheath. The protective layer and the outer protective sheath are usually also coaxial with the core and cladding and usually have a cylindrical shape. The protective layer serves to protect the core and the cladding, in particular when transporting and laying the optical waveguide against mechanical loads. The protective layer usually surrounds the cladding directly. There is usually a firm connection between the cladding and the protective layer. This is because when the protective layer is applied to the cladding, the fiber is passed through an extruder in which there is heated extrusion material. This extrusion material, which is applied to the fiber during extrusion, is usually heated plastic, e.g. polyimide, acrylic or silicone, and is the material from which the next protective layer is made. In order to ensure that the extrusion material hardens faster after application to the fiber, it is usually irradiated with UV light.

The protective layer, which is usually also referred to as the primary layer or primary coating, can also consist of several layers.

However, the protective layer is insufficient to adequately protect the fiber from mechanical and thermal loads, in particular when laying and transporting the optical waveguide. The coating therefore additionally consists of an outer protective sheath, which is usually also referred to as a secondary layer or secondary coating. The outer protective sheath is usually made of plastic and forms the outermost layer of the coating of the optical waveguide, that is to say it delimits it from the outside.

The outer protective sheath is firmly connected to the protective layer. The expression "firmly connected" in the sense of the invention consists of a connection between the outer protective sheath and the protective layer such that the outer surface of the protective layer is in contact with the inner surface of the protective sheath. "Inner surface" means the surface of the outer protective sheath that extends in the direction of the longitudinal axis of the optical waveguide and that faces the longitudinal axis. "Outer surface" means the surface of the protective layer that extends in the longitudinal direction of the optical waveguide and that faces away from the longitudinal axis. The protective layer and the outer protective sheath are usually hollow and cylindrical. Thus, the outer surface of the protective layer is the outer cladding of the protective layer and the inner surface of the outer protective sheath is the inner cladding of the outer protective sheath.

The outer surface of the protective layer is in contact with the inner surface of the outer protective sheath in such a way that relative movement between the protective layer and the outer protective sheath is blocked.

This can be achieved, for example, by gluing the protective layer to the outer protective sheath. Thus, the phrase "being in contact" also includes the fact that an intermediate layer, in particular an adhesive layer, may be present between the outer surface of the protective layer and the inner surface of the outer protective sheath. It is also conceivable that the intermediate layer is formed by a gel.

Since there is no free space between the protective layer and the outer protective sheath which allows a relative movement between the protective layer and the outer protective sheath, an optical waveguide with the coating according to the invention has a smaller volume and is more compact than a corresponding optical waveguide with a loose connection between the protective layer and the outer protective sheath. Its fluid mechanical properties, which are noticeable when the optical waveguide is used for optically measuring the temperature of a high-temperature melt, in which the optical waveguide is moved to the measuring point through a fluid-flowed line, are therefore particularly advantageous. As a result, the optical waveguide can be continuously transported through the line without twisting, getting stuck or tangling.

"Electromagnetic waves" are understood to mean all electromagnetic waves that can be emitted by a high-temperature melt.

For the purposes of the invention, the term "high-temperature melt" includes, in particular, metal melts. A metal melt is to be understood in particular as molten metal. It can contain one or more metals. In particular, the use according to the invention is suitable for measuring the temperature of molten steel and molten aluminum. The term "high-temperature melt" also includes non-metallic melts, such as salt melts and a mixture of metallic and non-metallic melts.

For the purposes of the invention, the term "measuring point" includes a point at which the high-temperature melt is located. However, it also includes a point at which there is no high-temperature melt, but which is ideally so close to the high-temperature melt that the electromagnetic waves can penetrate the optical waveguide in a quality and quantity that can be used for temperature measurement.

The fluid for the movement of the optical waveguide in the line is preferably a fluid which is necessary anyway for the respective treatment of the high-temperature melt, for example oxygen in the case of molten steel in the converter process. Alternatively, other gases can also be used, such as inert gases.

In a preferred embodiment, the coating is antistatic. "Antistatic" means that the coating prevents or eliminates electrostatic charges. The outer protective sheath is particularly preferably antistatic. This can be achieved, for example, by adding antistatic agents to the material of the outer protective sheath.

Electrostatic charges have proven to be problematic when moving the optical waveguide through a line through which fluid flows in order to measure a high-temperature melt, since the electrostatic attractive forces of the optical waveguide tend to stick to the conductor wall. In addition to the fixed connection between the protective layer and the outer protective sheath, the guiding properties of the optical waveguide can be further improved by the fluid flow line.

In a preferred embodiment, the outer protective sheath contains friction-reducing additives. In particular, this can be achieved by adding friction-reducing additives to the material of the outer protective sheath. Thanks to the friction-reducing additives, the optical waveguide can be guided through the line more easily. In addition, low-friction routing of the optical waveguide through the line reduces electrostatic charges. In addition, for example, the product sold by Clariant from Frankfurt am Main, Germany under the product name Hostastat or the product sold by Bayer under the product name Irgastat or the product sold by DuPont under the product name Entira.

In a preferred embodiment, the optical waveguide has a weight of at most 0.3 kg per kilometer of conductor length. Because the optical waveguide is so light, it can be better blown in through the line. It has been shown that a weight of 0.22 kg per kilometer of conductor length is optimal for the flow properties of the optical waveguide.

In a preferred embodiment, the optical waveguide has an overall diameter of less than 600 µm, particularly preferably less than 500 µm, particularly preferably less than 400 µm.

The optical waveguide preferably has a multimode fiber. In contrast to single-mode fibers, the core diameter of the multi-mode fiber is significantly larger. The resulting advantage is that a larger amount of light can be fed into the optical waveguide and guided through it to the optical detector. Multimode fibers suffer from mode dispersion.

This leads to transmission errors in the case of very long optical waveguide lengths, which are used in particular in communications technology. However, this problem is hardly relevant for the use according to the invention since transmission paths of many kilometers are conceivable but rarely occur. In addition, multimode fibers have advantages over mono-mode fibers in that they are cheaper to manufacture and less sensitive to laying or transporting. However, embodiments with single-mode fibers are also conceivable. In particular, OS2, OM1, OM2, OM3, OM4 may be considered as fiber categories.

A multimode fiber with a core diameter of 62.5 and a cladding diameter of 125 µm is preferred, particularly preferred according to the fiber category OM1. A fiber diameter of 50 and a sheath diameter of 125 µm is also conceivable.

The method according to the invention for optically measuring the temperature of a high-temperature melt provides that the optical waveguide conducts electromagnetic waves from a measuring point to an optical detector and is moved with the aid of a fluid through a line through which the fluid flows to the measuring point, in which the optical waveguide that is used has a core, cladding and a coating, the coating consisting of a protective layer and an outer protective sheath and the outer protective sheath being firmly connected to the protective layer.

The converter according to the invention has a container for holding molten metal and a measuring device for optically determining the temperature of the molten metal and is also part of the process and is equipped with
- an optical waveguide for conducting electromagnetic radiation emitted from the metal or from the tip of the optical waveguide to an optical detector,
- an optical detector for determining the temperature of the metal from an analysis of the electromagnetic radiation and
- a line through which fluid flows and which is arranged between the optical detector and the container and in which the optical waveguide is guided at least in sections and in which the optical waveguide is transported with the aid of the fluid, wherein the optical waveguide has a core, cladding and a coating, wherein the coating consists of a protective layer and an outer protective sheath and the outer protective sheath is firmly connected to the protective layer.

BRIEF DESCRIPTION OF DRAWINGS

The invention is explained in more detail below with reference to the following figure, which only shows an advantageous embodiment of the invention. It shows.

DETAILED DESCRIPTION

Figure 1:
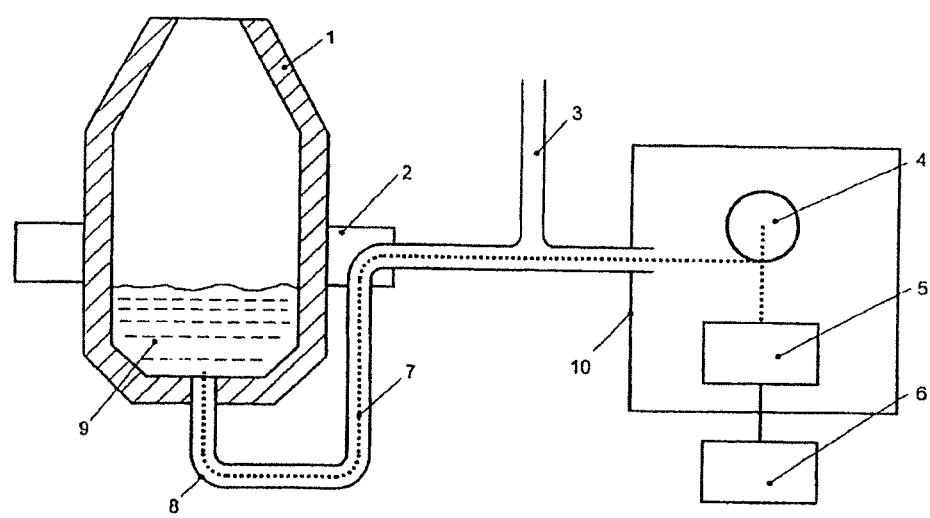
FIG. 1 exemplary use of an optical waveguide for optical measurement of the temperature of a high-temperature melt and FIG. 2 a perspective, exploded view of the optical waveguide to be used according to the invention.
Figure 2:
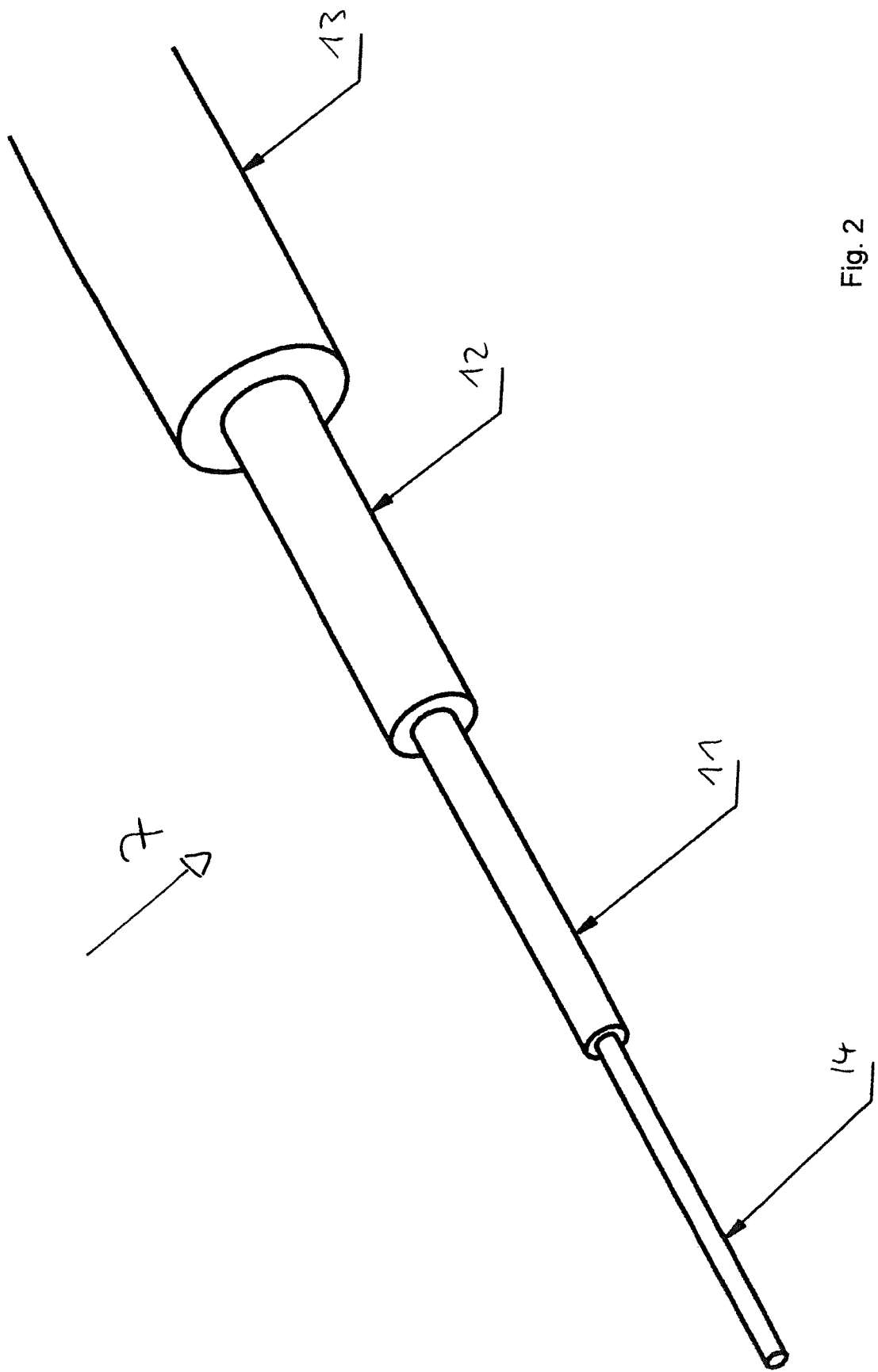

The figure shows a container 1 for receiving a high-temperature melt, which is molten metal in this case. This container 1 is mounted using swivel pins 2 in a frame, not shown. A gas supply 3 leads from a gas source (not shown in detail) via a gas line 8 to a gas opening provided in the bottom region of the container 1. Gas can be supplied to the metal bath 9 via the gas supply 3.

Also shown is a decoiling device 4, on which an optical waveguide 7 is wound. One end of the optical waveguide 7 is connected to an optical detector 5, which is connected to a signal analyzer 6. The decoiling device 4 and the optical detector 5 can be accommodated in a housing 10 that protects against heat. The optical waveguide 7 is introduced into the metal bath 9 through the gas line 8, which is supplied with gas by means of the gas supply 3.

The end of the optical waveguide 7 which extends into the metal bath 9 receives the radiation of the molten metal and conducts it via the optical waveguide 7 to the optical detector 5. There the optical signals are converted into electronic signals which can be further processed by the signal analyzer 6 in order to determine the temperature of the metal in the metal bath 9. Since the temperature of the molten metal leads to the melting of the immersed end of the optical waveguide, the optical waveguide 7 must be monitored. This is done with the help of the gas flowing through the gas supply 3 and the gas line 8.

The optical waveguide 7 has a core 14, cladding 11 and a coating. The core 14 has a diameter of 62.5 µm and the cladding 11 has a diameter of 125 µm. The fiber of the optical waveguide 7 is a multimode fiber of the fiber category OM1 in this example. The coating has a protective layer 12 and an outer protective sheath 13, which are firmly connected to one another. The outer protective sheath 13 is antistatic and contains anti-friction additives. The optical fiber 7 has a weight of 0.22 kg per kilometer of conductor length.

The invention claimed is:

1. A method for optically measuring the temperature of a high-temperature melt, comprising:
   introducing an optical waveguide into proximity with a high-temperature melt, through a fluid flow line, the optical waveguide having a core, a cladding and a coating, the coating having a protective layer and an outer protective sheath, wherein the outer protective sheath is firmly connected to the protective layer to block relative movement therebetween;
   wherein the protective layer and the protective sheath are each made of a plastic material;
   wherein the optical waveguide conducts electromagnetic waves from a measuring point associated with the high-temperature melt in proximity to an end of the optical waveguide, to an optical detector; and
   moving the optical waveguide with the aid of a fluid through said fluid flow line to the measuring point.

2. The method according to claim 1, wherein the outer protective sheath contains friction-reducing additives to prevent or eliminate electrostatic charges.

3. The method according to claim 1, wherein the optical waveguide has a weight of at most 0.3 kg per kilometer of conductor length.

4. The method according to claim 3, wherein the optical waveguide has a core diameter of 62.5 µm and a cladding diameter of 125 µm.

5. The method according to claim 1, wherein the optical waveguide is a multimode fiber.

6. The method according to claim 1, wherein the optical waveguide has a weight of 0.22 kg per kilometer of conductor length.

7. The method according to claim 1, wherein when the protective layer is applied to the cladding, the core and the cladding are passed through an extruder in which heated plastic extrusion material is applied, and is the material from which a next protective layer is made.

8. A method for optically measuring the temperature of a high-temperature melt in a container, the method comprising:
introducing a fluid flow line into said container;
introducing an optical waveguide through at least a portion of the fluid flow line, wherein the optical waveguide has a core, a cladding and a coating, and wherein the coating has a protective layer and an outer protective sheath, the outer protective sheath being firmly connected to the protective layer to block relative movement therebetween; wherein the protective layer and the protective sheath are each made of a plastic material; and
moving the optical waveguide with the aid of a fluid through the fluid flow line through which the fluid flows to a measuring point in which an end of the optical waveguide is disposed in proximity with the high-temperature melt, whereby the optical waveguide conducts electromagnetic waves from the measuring point to an optical detector to measure the temperature of the melt.

9. The method of according to claim 8, wherein said moving the optical waveguide comprises continuously feeding the optical waveguide to the measuring point.

10. A converter comprising:
a container for holding molten metal;
a measuring device for optically determining the temperature of the molten metal comprising:
an optical waveguide for guiding electromagnetic radiation emitted from the metal or from the tip of the optical waveguide to an optical detector;
the optical detector for determining the temperature of the metal from an analysis of the electromagnetic radiation; and
a line through which fluid flows between the optical detector and the container, in which the optical waveguide is guided at least in sections and in which the optical waveguide is transported with the aid of the fluid;
wherein the optical waveguide has a core, a cladding and a coating, the coating having a protective layer and an outer protective sheath, wherein the outer protective sheath is firmly connected to the protective layer to block relative movement therebetween; wherein the protective layer and the protective sheath are each made of a plastic material.

11. The converter according to claim 10, wherein the outer protective sheath is firmly connected to the protective layer via an adhesive to block relative movement therebetween.

12. The converter according to claim 10, wherein the outer protective sheath is firmly connected to the protective layer via a gel to block relative movement therebetween.

* * * * *